United States Patent [19]

Williams et al.

[11] Patent Number: 5,028,248
[45] Date of Patent: Jul. 2, 1991

[54] METHOD OF MELTING MATERIALS AND APPARATUS THEREFOR

[75] Inventors: John K. Williams; Charles P. Heanley, both of Faringdon, United Kingdom; Leonard E. Olds, Castle Rock, Colo.

[73] Assignees: Tetronics Research & Development Co., Ltd., Faringdon, United Kingdom; Manville Corporation, Denver, Colo.

[21] Appl. No.: 636,003

[22] Filed: Jan. 3, 1991

Related U.S. Application Data

[63] Continuation of Ser. No. 433,371, Nov. 9, 1989, abandoned.

[30] Foreign Application Priority Data

Nov. 17, 1988 [GB] United Kingdom ............... 8826862
May 18, 1989 [GB] United Kingdom ............... 8911443

[51] Int. Cl.$^5$ ............................................. C03B 5/235
[52] U.S. Cl. ........................................ 65/136; 65/347;
65/DIG. 4; 373/20; 373/27; 432/219
[58] Field of Search ............ 65/27, 136, 347, 134,
65/DIG. 4; 373/18, 19, 20, 27, 63; 432/210, 219

[56] References Cited

U.S. PATENT DOCUMENTS

| | | | |
|---|---|---|---|
| 3,917,479 | 11/1975 | Sayce et al. | |
| 4,122,292 | 10/1978 | Karinsky | 373/18 |
| 4,492,594 | 1/1985 | Curley | 65/134 |
| 4,545,798 | 10/1985 | Matesa | 65/27 |
| 4,668,271 | 5/1987 | Goode et al. | 65/136 |
| 4,671,765 | 6/1987 | Tsai | 65/135 X |
| 4,704,153 | 11/1987 | Schwenninger et al. | 65/134 |
| 4,734,551 | 3/1988 | Cheek | 373/18 X |
| 4,798,532 | 1/1989 | Kimura et al. | 432/210 X |

FOREIGN PATENT DOCUMENTS 0118412 9/1984 Fed. Rep. of Germany.
2140902 12/1984 United Kingdom.

Primary Examiner—Robert L. Lindsay
Attorney, Agent, or Firm—Beveridge, DeGrandi & Weilacher

[57] ABSTRACT

A method of melting materials at power densities in excess of 25 KW/ft$^2$ of area within the metal shell of a melting vessel which method consists essentially of continuously feeding the material to be melted to a plasma arc furnace which is equipped with at least two transferred arc plasma electrodes and with means to rotate at least the portion of the furnace containing the material to be melted, melting the said feedstock material using the at least two transferred arc plasma electrodes whilst rotating at least the rotatable portion of the furnace containing the material to be melted and continuously discharging the material which has been melted from the furnace.

Apparatus for melting materials under power densities of greater than 25 KW/ft$^2$ is also disclosed.

15 Claims, 1 Drawing Sheet

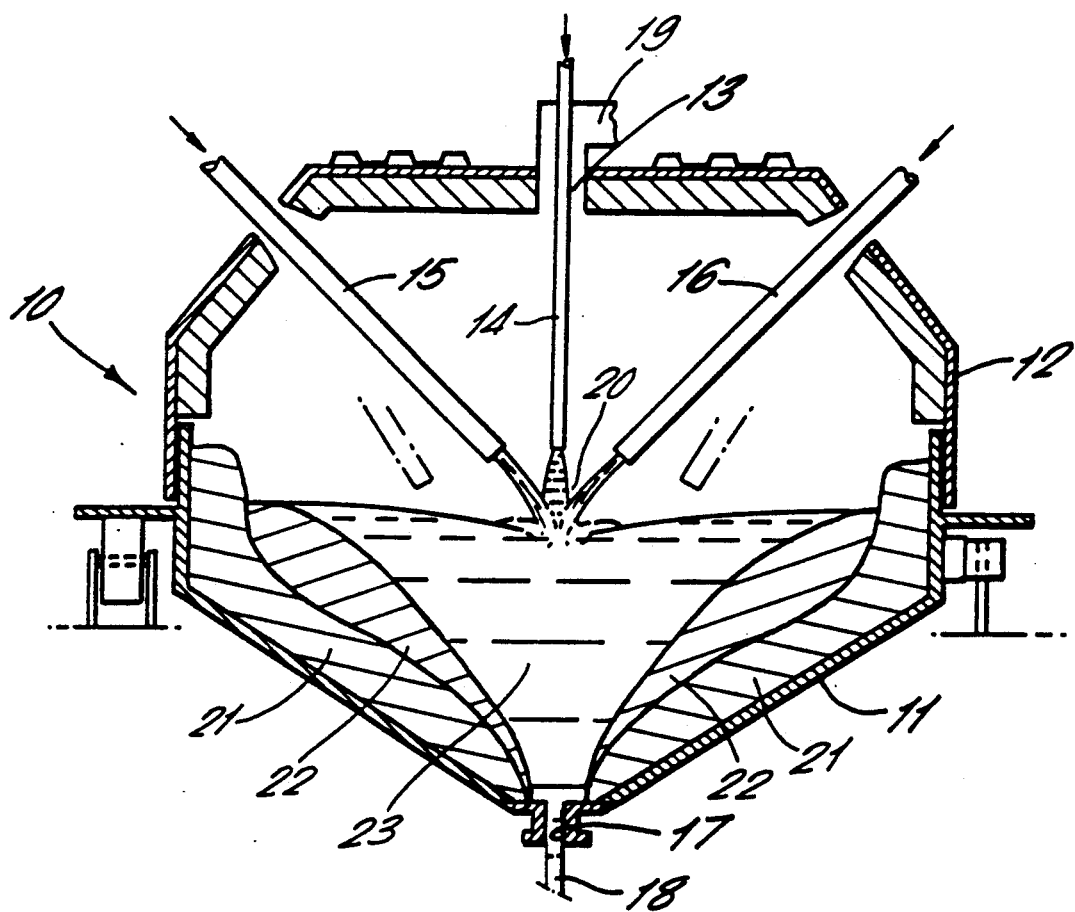

METHOD OF MELTING MATERIALS AND APPARATUS THEREFOR

This application is a continuation of application Ser. No. 07/433,371, filed 11/9/89 now abandoned.

INTRODUCTION AND BACKGROUND

The present invention relates to a method of melting materials and an apparatus therefor, and, in particular, to a method and apparatus for melting glass, refractory oxides, silicates, or other essentially non-metalliferrous materials including the various batch materials for rock wool manufacture. Furnaces for melting such materials include the use of round, elliptical, and rectangular shaped melting shells, and graphite, molybdenum, tungsten and tin oxide melting electrodes. Lower temperature melts such as glass may also utilize combustion atmospheres above the melt surface.

These glass and non-metalliferrous oxide melting furnaces differ significantly from the metallurgical smelting furnaces in that they have essentially little if any of a molten metal layer underneath the molten slag, glass or oxide layer. Thus metallurgical furnaces are usually characterized by a relatively thick metallic layer covered by a slag layer that is kept relatively shallow by more frequent tapping than is given to the metallic layer. In these metallurgical smelting furnaces, emphasis is generally given to keeping the slag as fluid as possible in order to effect efficient separation of metallic prill from the slag and to minimize the possibility of slag foaming. Thus extensive effort is made to develop proper fluxing practice that will form slags with viscosities that can be measured in centipoises as contrasted to the non-metallurgical furnaces where viscosities of from 5 to 1000 poises are desired for subsequent melt processing steps such as fiberization or proper glass making. Furthermore, it has not been possible continuously to bottom tap such metallurgical furnaces because of the need for collecting a significant metallic pool that inter-reacts chemically with the slag layer.

As noted above, the non-metallurgical glass and oxide melting furnaces differ greatly in their exact melting equipment and practices. However such furnaces all share common disadvantages including:
- long residence times of the melt in the furnace;
- relatively large furnace sizes;
- high energy losses;
- selective melting of components giving an unmelted scum;
- the inhomogeneous nature of the emergent melt;
- the lack of flexibility in stopping the furnace quickly and in changing of melt composition Parameters that measure the efficiencies of non-metallurgical furnaces include:
- furnace hearth ratings such as the number of square feet of hearth area required to melt one ton of batch per day;
- residence time of the melt in the furnace;
- power or energy consumption per ton of batch melted;
- percent thermal efficiency of the furnace.

Modern glass and oxide melting furnaces generally have the following ranges for these parameters:
2 to 7ft$^2$ of hearth area per ton of batch melted per day.
3 to 48 hours of residence time of melt in the furnace.
700 to 1800 KWH (or BTU equivalent) per ton of batch melted.
25 to 75% thermal efficiencies.

It has been found that the input power (or energy) density is a major factor affecting furnace performance; within limits, the higher power density, the more efficient in general will be the furnace. The above listed glass and oxide melting furnace performances have been attained in production sized furnaces at power (or energy) densities of from 7 to 20 KW/ft$^2$ of furnace area combined within the metal shell of the furnace (or the outside of the brick lining for furnaces without metal shells). It has been found that for power densities significantly higher than about 20 KW/ft$^2$, either the furnace lining rapidly erodes or the cooling of the metal sidewall is overwhelmed resulting in disastrous break outs through the sidewall. Also with power densities of from 20 to 25 KW/ft$^2$, oxide or glass furnaces may tend to foam causing an uneven and discontinuous furnace operation.

For the more viscous melts of the non-metallurgical melting furnaces, these power density limitations appear to be associated with the manner in which heat is transferred from the energy source throughout the melt. For combustion atmospheres, the heat must penetrate through the surface layers of the melt first, before thermal convective currents can carry it throughout the melt volume. Thus, with high energy densities, it is easy to effect excess melt surface temperatures that cause a rapid destruction of the brick at the melt line. Such high energy densities must be avoided to prevent premature melter rebuilds.

In the case of melting using either graphite, metal or tin oxide electrodes, the heat generated between the electrodes is believed to be transferred throughout the melt by an electromagnetic stirring of the melt the intensity of which increases with increasing power density. In production sized glass and oxide melters, as the power density increases above about 20 KW/ft$^2$ of hearth area, the electromagnetic convective currents apparently convey the excess heat to the brick or metal sidewalls faster than to the batch at the surface. Thus the brick or metal shell fails prematurely, or the melt may actually foam as the result of localized overheating because the generated heat could not be dissipated throughout the melt sufficiently fast.

To overcome these disadvantages, especially those of size and energy consumption, plasma melting devices have been proposed. These usually employ a rotating steel basin in which the melting is achieved by the use of a non-transferred arc plasma electrode, the feedstock being melted as a thin film supported either on a refractory lined wall (which due to the intensity of the plasma-heated plume tends to erode and contaminate the product) or on a bed of the feedstock material. U.S. Pat. No. 4545798 describes a method and apparatus for melting glass using a plasma melting device in which the glass is liquefied at a temperature below 1315° C. and flows through a drain at the bottom of the melting vessel, the liquefied material being permitted to flow from the vessel before it becomes fully melted. Additional material is fed to the surface to maintain a substantially constant layer of the unmelted material, thereby maintaining the temperature of the melting vessel relatively low and eliminating the need for forced cooling of the vessel. This prior art device tends to be of limited throughput, cannot cope with segregations in the feed material and is not very efficient in its use of energy.

We have now developed a method and apparatus for melting glass, refractory oxides, silicates, ceramics, slags and rockwool batch materials, on a continuous basis which overcomes the disadvantages of the prior art.

SUMMARY OF THE INVENTION

Accordingly, the present invention provides a method of melting materials at power densities in excess of 25 KW/ft$^2$ of area within the metal shell of a melting vessel which method comprises continuously feeding the material to be melted to a plasma arc furnace, melting the said feedstock material using at least two transferred arc plasma electrodes whilst rotating at least the portion of the furnace containing the material to be melted and continuously discharging the molten material through the rotating bottom of the furnace.

We have discovered that by proper coupling of two or more plasma torches with both the feedstock and melt surface, a melt volume may be produced with a completely different form of heat distribution than that obtained in the prior art melters. As a result, for example power densities in the range of from 25 to 85 KW/ft$^2$, power densities significantly in excess of 25 KW/ft$^2$ of the hearth area may now be practically obtained without sidewall damage and without foaming or fuming of the melt surface. The practical result of the discovery is the development of highly efficient, short residence time melters that can be readily stopped and restarted providing an important flexibility not attainable in other glass or oxide slag melters.

The present invention also provides apparatus for melting materials which apparatus comprises a furnace, the furnace having a fixed upper shell and a rotatable lower shell, the fixed upper shell having at least two transferred arc plasma electrodes mounted in the roof thereof, means to rotate the rotatable lower shell, an inlet for the introduction of a feedstock material to the furnace and an outlet for the withdrawal of the molten material from the bottom of the furnace.

The method and apparatus of the present invention is particularly appropriate for melting glass but it may be used for melting refractory and other materials, such as zirconia, alumina and ceramic materials, slags, and rockwool feedstock.

The method of the present invention is adapted for continuous operation, the feedstock material being fed continuously to the plasma arc furnace and the molten material being continuously collected from the furnace. The plasma arcs are generated by a system comprising at least two plasma electrodes in which at least one electrode acts as the anode and one electrode acts as the cathode. Using this arrangement of plasma electrodes, it will be apparent that there is no requirement for a return electrical connection, as the conductive path is via the plasma gases or through the molten material itself. Accordingly, there are no contamination problems using the process of the invention.

The plasma electrodes are preferably inclined at an angle to one another, preferably in a symmetrical disposition. The plasma electrodes are preferably also mounted in the roof of the furnace and positioned in a manner such that they can be inserted towards or withdrawn from the surface of the molten material at a variable angle from the vertical. This provides a means of varying the lengths, distribution and angles of the arcs, which, in conjunction with the power input, allows melting to be controlled and the units to be operated at optimum conditions. Generally, in carrying out the method of the present invention the plasma electrodes are operated with both arcs of equal length, coupled at a convenient height which may be via the molten material, in the central region of the furnace.

The feed material is generally introduced into the plasma arc furnace via a port or feed tube. If desired, the feed material may be entrained in a suitable gas to assist its introduction into the furnace.

The improved plasma arc furnace is constructed in two parts namely an upper shell and a lower shell with the lower shell being adapted for rotation typically at a speed of the order of 10 to 30 revolutions per minute in order to receive uniform heating of the feedstock material, by the plasma heat.

BRIEF DESCRIPTION OF THE DRAWING

The present invention will be further described by way of example with reference to the single figure of the accompanying drawings which is an apparatus according to the invention for melting glass or a refractory oxide.

DETAILED DESCRIPTION OF INVENTION

Referring to the drawing, the apparatus comprises a melting furnace 10 which is preferably fabricated from steel. The furnace is approximately three feet in diameter and comprises two parts, namely a rotatable shell 11 and a fixed upper shell 12. The rotatable shell 11 is connected to a rotation mechanism which is not shown in detail. The fixed upper shell 12 is equipped with a central feed hole 13 through which feed tube 14 extends. The feed material may be introduced into the furnace at any rate appropriate to the rate at which the material can be melted in the furnace. The fixed upper shell 12 is further provided with twin plasma electrodes, electrode 15 acting as the anode and electrode 16 acting as the cathode. The gas supplied to these electrodes is preferably argon.

The furnace 10 is equipped with an outlet orifice or tapping hole 17 through which a stream of molten material 18 emerges. The feed material is supported on a supporting bed of feed material and this "autogenous" lining will not contaminate the molten product and has been found to possess useful thermal insulation properties. There is, therefore, no need to install a refractory lining in the basin even for low melting temperature materials such as glass. Depending upon the operating temperature, it may not be necessary to equip it with water or forced air cooling. The fixed upper shell 12 is also provided with a port 19 for venting the off-gases.

The height of the fixed shell/rotatable shell combination, not taking into account the plasma electrodes, 15,16, feed tube 14, exhaust gas duct 19, etc., is also approximately 3 feet, giving a very compact unit compared to conventional glass melting tanks. This unit is thus designed to process up to 2000 lbs of glass per hour with a power input of 600 KW and a residence time of about four minutes. By close metering of the feed and vigorous in-melt stirring, uniform composition is achieved. The temperature of the product stream from the orifice is controllable by varying the angle of the plasma electrodes. These are important parameters should the stream need to be further processed, for example, fiberized.

The plasma electrodes are mounted in the roof of fixed shell 12 at a variable angle to one another and such that they may be inserted towards or withdrawn from the melt surface by means not shown. This provides a means of varying the lengths and distribution of the arcs, which, in conjunction with the power input, allows the melting to be controlled and the unit to be operated at optimum conditions. The fixed shell 12 may be raised or lowered as well by means not shown to give further flexibility to positioning the electrodes.

In operation of the plasma arc furnace in accordance with the invention, when first struck the plasma arcs couple to one another through the air there being no need to introduce any other conducting mechanism (for example, a carbon rod) to complete the electrical circuit, hence eliminating a source of contamination. Having struck the plasma arcs and melted the feed, the electrical conduction path will be via the molten mass, ensuring maximum transference of energy for heating purposes.

The feed material is introduced via tube 14 placed so that the particles fall into the melt through the high energy plasma arc coupling zone 20. If desired, the feed may be entrained in a suitable gas to assist its introduction into the furnace 10. In this example, the feed tube 14 is shown surrounded by the gas exit port 19 so that a proportion of the heat energy contained in the exhaust gases is transferred to the incoming feed, thereby reducing the overall energy requirements.

The rotatable shell 11 is rotated at a speed typically of the order of ten to thirty revolutions per minute in order to assist in the distribution of the heat throughout the molten material and to assist in even melting of the feed material.

The unit is designed to operate on a continuous basis, the feed input being essentially equal to the product output with, at any one time, a pre-determined mass being contained and processed within the basin. The hottest (and hence, lowest viscosity) material will be at the centre of the basin, where it flows downwards and eventually out of the centrally located outlet orifice 17, affording a longer residence time for material in the cooler regions. The temperature profiles are shown in the Figure where the walls of the rotatable shell 12 can be seen to be protected by a solid shell 21 of feed material. Next to this is a region 22 of skummy melt, with the hottest liquid zone 23 at the centre. It is, therefore, possible to establish a balance between the feed rate and the power input and maintain an active fusion or reaction zone within defined spatial limits, thus allowing the size of the furnace to be considerably reduced from that of conventional glassmelting tanks.

For some melting applications, the orifice 17 is fabricated from a precious metal, for example, platinum and it is conventional practice to heat the orifice to minimise the formation of a cold skin on the surface of the emergent molten stream. To compensate for any wear the orifice may sustain, a needle arrangement may be installed in the orifice to give a means of controlling the outlet flow.

The system may be additionally controlled by the use of a radiation sensing device (not shown) placed so as to monitor the flow rate and temperature of the outlet stream, connected to suitable circuitry and mechanisms to control the degree of heating and the rate of discharge from the melter.

The melter of the present invention may also be scaled up in size with a proportionate increase in throughput rates. Examples include:

4500 lbs/hour of glass through a 4.5 foot diameter melter with a power loading of 1250 KW.

7700 lbs/hour of glass through a 5.9 foot diameter melter with a power loading of 2320 KW.

Because of the unique spatial coupling of the plasma with the feedstock and the melt surface together with a close control of the outlet stream temperature by a modulation of the torch angles, we have found it possible successfully to develop and utilize power densities well in excess of 25 KW/ft$^2$ of hearth area. The corresponding furnace performance parameters for the melter of the present invention when operating on soft glass are:

Hearth Rating: 0.3 ft$^2$ of hearth are per ton of glass melted/day

Residence Time: .97 hours

Power Density: 85 KW/ft$^2$ of hearth area inside melter shell

Power Consumption: 600 KWH/ton of glass melted

Thermal Efficiency: 87%

Thus there is an order of magnitude improvement in the melter hearth ratings and two orders of magnitude improvement in the melt residence time. In addition the power consumption is significantly reduced with a corresponding improvement in thermal efficiency.

By variation in the distance between the two torches, the apex angle between the two torches and the distance from the melt surface of the two torches it has been demonstrated to be possible to vary not only the impingement control volume but also the sectional profile of the low viscosity regimes.

Thus, as the distance of the plasma arc torches from the melt surface increases, the plasma arc impingement area increases. This has the effect of causing the profiles of the regions of low viscosity molten material 23 and scummy melt 22 to change, with the low viscosity molten region becoming wider but shallower to afford approximately the same total volume of molten material, for the same energy input from the plasma arc torches.

In addition because of the relatively small melt volume within the melter of the present invention and the ability of the variably inclined plasma torches to quickly penetrate through a solidified melt to the orifice level, we have found it possible to start and stop the melter of the present invention whenever desired. To stop the melter, the power is cut and the batch injection stopped. The melter may or may not continue to drain. The shell cools quickly and within 5 to 10 minutes the rotation may be stopped and the melter left unattended for as long as desired. To restart, the torches are angled towards one another with a typical apex angle of between 30° to 45° and the power applied. By proper spacing of the torches to within a few inches of each other, it is possible to bring the orifice to the melt temperature within 10 to 15 minutes of starting. At that time, the torch angles are reduced and the batch injection is started. Within 20 to 30 minutes the entire melter is as thermal equilibrium and full melt rates are attained.

Melt compositions may similarly be quickly changed again because of the small melt volumes in the melter. Equilibrium compositions are reached after approximately 20 to 30 minutes of changing the composition. It is also possible to change quickly from refractory oxide melts to glassy melts with similar results.

We claim:

1. A method of melting materials at power densities in excess of 25 KW/ft$^2$ of area within the metal shell of a melting vessel which method consists essentially of continuously feeding the material to be melted to a plasma arc furnace which is equipped with at least two transferred arc plasma electrodes of opposite polarities and with means to rotate at least the portion of the furnace containing the material to be melted, melting the said feedstock material to form a molten pool using the at least two transferred arc plasm electrodes whilst rotating at least the rotatable portion of the furnace containing the material to be melted and continuously discharging the material from the molten pool in a continuous stream.

2. Method according to claim 1 wherein the material to be melted is selected from the group consisting of glass batch, a refractory oxide material, a ceramic material, a slag and a rock wool feed material.

3. Method according to claim 1 wherein the material to be melted forms an autogenous lining in the furnace.

4. Method according to claim 1 wherein the plasma arc electrodes are coupled via the molten material, at or in close proximity to the melt surface, with at least one electrode acting as the cathode and at least one electrode acting as the anode.

5. Method according to claim 1 wherein the feedstock material is entrained in a gas and injected into the space electrically coupled by the transferred plasma arc electrodes.

6. Method according to claim 1 wherein the plasma arc electrodes are inclined at an angle to the vertical.

7. Method according to claim 6 wherein the plasma arc electrodes are symmetrically disposed each being at an angle of from 30° to 60° to the vertical.

8. Method according to claim 1 wherein the plasma arcs are formed using an inert gas selected from the group consisting of argon, nitrogen, and a mixture thereof as the ionizing gas.

9. Method according to claim 1 wherein the exit stream temperature is controlled by modulating the angle of the plasma arc electrodes in accordance with an automatic stream temperature measuring device.

10. Method according to claim 1 wherein the melt flow rate is controlled by modulating the angle of the plasma arc electrodes in accordance with an automatic device for measuring stream width.

11. Apparatus for melting materials under power densities of greater than 25 $KW/ft^2$ which apparatus consists essentially of a furnace, the furnace having a fixed upper shell and a rotatable lower shell serving as a basin for holding a molten pool of the said material, the fixed upper shell having at least two transferred arc plasma electrodes of opposite polarities mounted in the roof thereof, means to rotate the rotatable lower shell, an inlet for the introduction of a feedstock material to the furnace and an outlet for the withdrawal of the molten material from the molten pool of the said material in a continuous stream.

12. Apparatus according to claim 11 wherein the fixed upper shell is provided with means for the adjustment of the angle of each of the plasma electrodes.

13. Apparatus according to claim 11 wherein the fixed upper shell is provided with means to adjust the height of each of the plasma electrodes.

14. Apparatus according to claim 11 wherein the inlet for the feedstock material comprises a pipe which is surrounded, at least in part, by a gas exit port.

15. Apparatus according to claim 11 wherein the rotatable lower shell of the furnace is provided with an autogenous lining.

* * * * *